Figure 1:
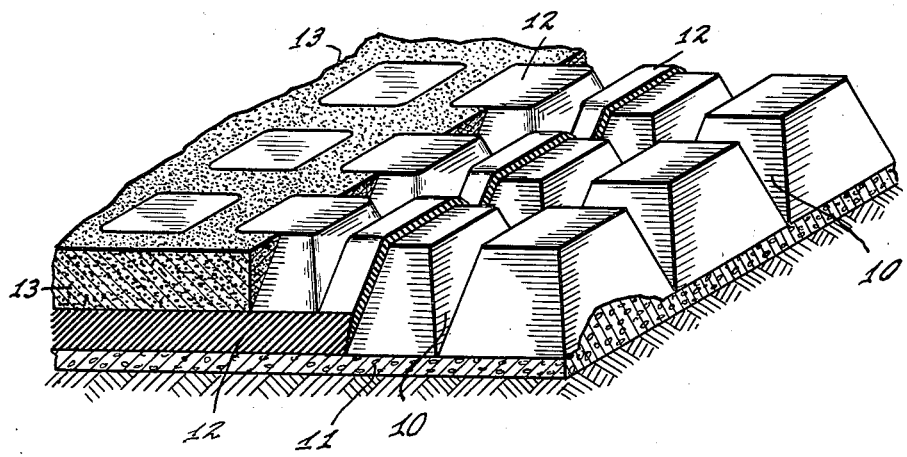

Jan. 20, 1942.　　K. E. McCONNAUGHAY　　2,270,459
PAVEMENT
Filed July 29, 1938

INVENTOR.
KENNETH E. McCONNAUGHAY,
BY
ATTORNEYS.

Patented Jan. 20, 1942

2,270,459

UNITED STATES PATENT OFFICE 2,270,459

PAVEMENT

Kenneth E. McConnaughay, Otterbein, Ind.

Application July 29, 1938, Serial No. 221,933

4 Claims. (Cl. 94—9)

It is the object of my invention to produce a pavement combining the best features of asphalt pavements and concrete pavements. More specifically, it is my object to produce a pavement which will have substantially the surface density and non-skid properties of concrete with the elasticity and self-healing qualities of asphalt.

In carrying out my invention I form the body of the pavement in such a manner that its upper surface contains a substantial proportion of relatively large voids the walls of which are coated with a bituminous binder. I then apply to the upper surface of the pavement a concrete grouting comprising a mixture of relatively fine aggregate and a binder, such as cement, such grouting serving to fill all the surface voids of the pavement.

The body of the pavement may be formed in different ways, but it is preferably formed as a concrete slab scored deeply on perpendicular lines with grooves spaced apart a distance approximating the thickness of the slab, and with a surface coating of bituminous composition then applied to cover the walls of the grooves.

The accompanying drawing illustrates my invention, the single figure being a fragmental isometric view, somewhat idealized, illustrating pavement made by the method referred to above.

In producing the pavement illustrated, I mix sand or relatively fine-gravel aggregate with water and a suitable binder such as cement or clay, and spread the mixture evenly over the surface to be paved. The surface of the mixture is then scored deeply along perpendicular lines as indicated at 10 to divide the upper surface of the slab into parallel rows of segments integral with the base slab 11 below the scoring 10. The spacing of the score lines 11 may vary considerably, but I prefer to space them a distance approximately equal to their depth, and prefer to make them deep enough to extend either completely through the slab or so nearly through that any fractures which occur will follow the score lines.

To the upper surface of the concrete slab thus produced I apply a bituminous coating 12, desirably brushed on, to cover all exposed surfaces. The coating may be asphalt, tar, a cut-back asphalt or tar, or an emulsified asphalt or tar. If the scoring 10 is about three inches in depth with parallel score lines spaced three inches apart, about one gallon of the bitumen coating per square yard of pavement will be about a suitable proportion.

To the surface of the pavement thus treated, there is then applied a concrete mixture 13 comprising fine aggregate, water, and a binder such as cement or clay. This mixture is grouted over the surface and struck off level with the coated tops of the segments into which the concrete slab has been divided by the scoring 10. All the surface voids are thereby filled, and the pavement given a dense surface possessing the non-skid properties of a concrete surface. Any cracks which may develop in the base-slab or in the grouting 13 will be filled by the bitumen coating 12, and the pavement therefore has the self-healing properties of a bituminous pavement.

I prefer to use an emulsified bitumen for the coating 12, as it can be used when the concrete materials are wet. I also find it an advantage to incorporate a bituminous emulsion in the concrete. For example, I may form the concrete slab of a mixture of one part cement, one part bituminous emulsion, and 10 parts aggregate with added water to create the desired consistency; and the grouting may be formed of one part cement, one part emulsion, and four parts fine aggregate, again with added water. The addition of the emulsion will cause a better adhesion between the coating 12 and the concrete of the slab and grouting.

The pavement described may be considered as a bituminous pavement the aggregate particles of which have been cast in place to predetermined forms and so shaped and disposed as to be keyed together to produce a dense pavement of great stability.

I claim as my invention:

1. A pavement, comprising a base slab of concrete having two sets of intersecting grooves dividing its upper surface into segments, said grooves having a depth equal to more than half the thickness of the base slab and having inclined side walls converging downwardly to leave the base slab consisting of a plurality of rows of frusto-pyramidal concrete blocks interconnected near their bottoms by relatively thin concrete webs, the spacing of said grooves approximating their depth, a bituminous coating on the walls of said grooves, and concrete grouting filling said grooves and confined thereto to form a grid comprising intersecting ribs of wedge-like cross-section.

2. A pavement, comprising a base slab of concrete having two sets of intersecting grooves dividing its upper surface into segments, said grooves having a depth equal to more than half the thickness of the base slab and having inclined side walls converging downwardly to leave the base slab consisting of a plurality of rows of frusto-pyramidal concrete blocks interconnected near their bottoms by relatively thin concrete webs, a bituminous coating on the walls of said grooves, and concrete grouting filling said grooves and confined thereto to form a grid comprising intersecting ribs of wedge-like cross-section.

3. A pavement, comprising a base slab of concrete having deep intersecting grooves dividing its upper surface into segments, a bituminous coating on the walls of said grooves, and concrete grouting filling said grooves to a point approximately flush with the upper surface of said base slab whereby the coated portions of the base slab between the grooves will be exposed, said base slab being formed of concrete mix containing a bituminous emulsion.

4. A pavement, comprising a base slab of concrete having deep intersecting grooves dividing its upper surface into segments, a bituminous coating on the walls of said grooves, and concrete grouting filling said grooves to a point approximately flush with the upper surface of said base slab whereby the coated portions of the base slab between the grooves will be exposed, said grouting being formed of concrete mix containing a bituminous emulsion.

KENNETH E. McCONNAUGHAY.